United States Patent [19]

Cheng et al.

[11] Patent Number: 4,935,467

[45] Date of Patent: Jun. 19, 1990

[54] POLYMERIC BLENDS

[75] Inventors: Tai C. Cheng, Mountain View; Bruce A. Kaduk, Mountain View; Ashok K. Mehan, Union City; David D. Taft, Atherton; Carl J. Weber, Redwood City; Steven C. Zingheim, Palo Alto, all of Calif.

[73] Assignee: Raychem Corporation, Menlo Park, Calif.

[21] Appl. No.: 166,954

[22] Filed: Mar. 11, 1988

Related U.S. Application Data

[63] Continuation-in-part of Ser. No. 24,738, Mar. 11, 1987, abandoned, and a continuation-in-part of Ser. No. 58,088, Jun. 4, 1987, abandoned.

[51] Int. Cl.$^5$ .................. C08L 27/12; C08L 27/16; C08L 27/18; C08L 27/20
[52] U.S. Cl. .................... 525/199; 252/511; 428/379
[58] Field of Search ............ 525/199, 88; 252/511; 428/379

[56] References Cited

U.S. PATENT DOCUMENTS

| | | | |
|---|---|---|---|
| 3,864,228 | 2/1975 | Rossetti, Jr. | 260/900 |
| 3,987,126 | 10/1976 | Brodoway | 260/900 |
| 4,094,949 | 6/1978 | Yokokawa et al. | 525/199 |
| 4,115,481 | 9/1978 | Finlay et al. | 260/900 |
| 4,158,678 | 6/1979 | Tatemoto et al. | |
| 4,200,568 | 4/1980 | Trautvetter et al. | 525/199 |
| 4,487,882 | 12/1984 | Ueta et al. | |
| 4,530,970 | 7/1985 | Morozumi et al. | |
| 4,560,737 | 12/1985 | Yamamoto et al. | 525/88 |

FOREIGN PATENT DOCUMENTS

| | | |
|---|---|---|
| 0105433 | 4/1984 | European Pat. Off. |
| 0132834 | 2/1985 | European Pat. Off. |
| 59-041351 | 3/1984 | Japan |
| 59-062635 | 4/1984 | Japan |

OTHER PUBLICATIONS

"Fluorinated Thermoplastic Elastomers", Tatemoto, in International Polymer Science and Technology, vol. 12, No. 4, 1985, pp. 761-767.
U.S. Patent Application Ser. No. 07/246,885 filed Sep. 15, 1988.

*Primary Examiner*—Allan M. Lieberman
*Attorney, Agent, or Firm*—Edith A. Rice; Herbert G. Burkard

[57] ABSTRACT

Novel compositions comprise a blend of
(A) a thermoplastic polymer selected from copolymers of ethylene and tetrafluoroethylene, and thermoplastic vinylidene fluoride polymers; and
(B) a thermoplastic elastomer having (i) at least one elastomeric segment comprising (a) vinylidene fluoride, hexa- or pentafluoropropylene, and tetrafluoroethylene repeating units in a mole ratio of 45-90:5-50:0-35 or (b) perfluoro(alkyl vinyl ether), tetrafluoroethylene and vinylidene fluoride repeating units in a mole ratio of 15-75:0-85:0-85; and (ii) at least one nonelastomeric segment selected from segments comprising ethylene and tetrafluoroethylene repeating units in a mole ratio of 40-60:60-40, and segments comprising vinylidene fluoride, hexafluoropropylene and tetrafluoroethylene repeating units in a mole ratio of 0-100:0-50:0-100, with the proviso that if the thermoplastic polymer is a vinylidene fluoride polymer, the blend is crosslinked.

11 Claims, 1 Drawing Sheet

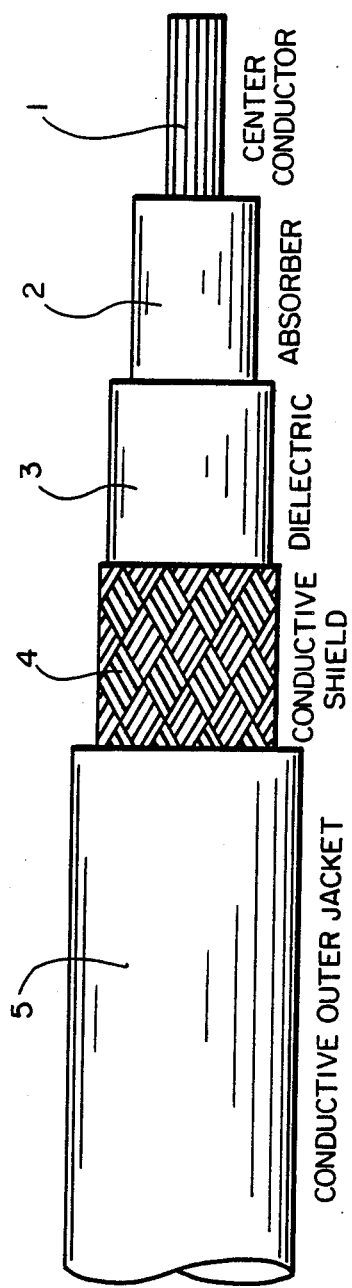
FIG_1

POLYMERIC BLENDS

BACKGROUND OF THE INVENTION

This application is a continuation-in-part of applications Ser. Nos. 024,738 and 058,088 filed Mar. 11, 1987 and Jun. 4, 1987, now both abandoned, respectively, the entire disclosures of which are incorporated herein by reference.

This invention relates to polymeric compositions, heat recoverable articles prepared therefrom and electrical conductors insulated therewith. It further relates to conductive polymeric compositions, cables jacketed therewith and electrical devices made therefrom.

Thermoplastic polymers of vinylidene fluoride (also referred to herein as PVDF) and copolymers of ethylene and tetrafluoroethylene (also referred to herein as ETFE) have many desirable properties such as solvent resistance, tensile strength, and the like. However for certain uses, these polymers can be too stiff. Such uses include, for example, wire and cable insulation and jacketing, the preparation of heat recoverable tubing for use as harnessing for wire and cable, and other uses where flexibility is desired. It has now been discovered that blends of PVDF or ETFE copolymers with certain thermoplastic elastomers have unexpectedly lowered stiffness (as measured by the 2% secant modulus) while substantially retaining the desired tensile strength, solvent resistance and the like.

It is well known to add carbon black or other conductive particles to polymeric compositions to provide conductive polymeric compositions for various uses. One use of such a conductive polymer composition is as a conductive jacket on electrical cables, such as the conductive jacket provided on a high frequency attenuation cable as described in U.S. Pat. No. 4,347,487 to A.R. Martin, the entire disclosures of which are incorporated herein by reference.

It is also well known to use an ethylene-tetrafluoroethylene copolymer for cable jacketing. However, when carbon black is added to ETFE to prepare a conductive composition for use as a cable jacket, it has been found that the resulting jacket tends to be less flexible than desired. This can lead, under certain circumstances, to undesired cracking of the cable jacket.

It has been discovered that blends of ETFE with certain thermoplastic elastomers can incorporate relatively high loadings of carbon black while also retaining the desired flexibility as well as solvent resistance, tensile strength and the like.

Compositions containing vinylidene fluoride polymers with other fluoropolymers are known. For example, U.S. Pat. No. 4,560,737 to Yamamoto et al, relates to a piezoelectric material comprising a blend of a vinylidene fluoride base resin, for example vinylidene fluoride homopolymer or copolymer with, for example, tetrafluoroethylene, hexafluoropropylene, or hexafluorobutylene, and a modified fluoroelastomer. The fluoroelastomer is modified by block or graft copolymerization with vinylidene fluoride monomer or a vinylidene fluoride-containing monomer mixture. The blend can be used to form a sheet or film having a high piezoelectric modulus.

U.S. Pat. No. 4,530,970 to Morozumi, et al, discloses a fluoroelastomer composition useful as a lining material for large scale tanks. The composition comprises a peroxide-curable, fluorinated copolymer elastomer, polyvinylidene fluoride in fine powder form, a peroxide and a polyallyl monomer. The components are mixed at a temperature where the fine powder polyvinylidene fluoride will not melt.

Neither of these references suggest that cross-linked blends of PVDF with certain fluorine-containing thermoplastic elastomers, as defined herein, would have the desired balance of properties, namely, relatively low stiffness with relatively high tensile strength.

SUMMARY OF THE INVENTION

One aspect of this invention comprises a composition comprising a blend of (A) a thermoplastic polymer selected from copolymers of ethylene and tetrafluoroethylene, and thermoplastic vinylidene fluoride polymers; and (B) a thermoplastic elastomer having (i) at least one elastomer segment comprising (a) vinylidene fluoride, hexa- or pentafluoropropylene, and tetrafluoroethylene repeating units in a mole ratio of 45–90:5–50:0–35 or (b) perfluoro(alkyl vinyl ether), tetrafluoroethylene, and vinylidene fluoride repeating units in a mole ratio of 15–75:0–85:0–85; and (ii) at least one nonelastomeric segment selected from segments comprising ethylene and tetrafluoroethylene repeating units in a mole ratio of 40–60:60–40, and segments comprising vinylidene fluoride, hexafluoropropylene and tetrafluoroethylene repeating units in a mole ratio of 0–100:0–50:0–100, with the proviso that if the thermoplastic polymer is a vinylidene fluoride polymer, the blend is crosslinked.

Other aspects of this invention comprise: a heat recoverable article comprising said composition; an elongate electrical conductor insulated with said composition; a conductive composition comprising said composition and conductive particles dispersed therein; and a cable having a jacket of said conductive composition.

BRIEF DESCRIPTION OF THE DRAWING

The drawing is a partial cross sectional view of a high frequency attenuation cable having a jacket made of a conductive polymeric composition of this invention.

DETAILED DESCRIPTION OF THE INVENTION

Copolymers of ethylene, tetrafluoroethylene and optionally a third monomer are known crystalline thermoplastic polymers. The mole ratio of ethylene to tetrafluoroethylene can be about 35–60:65–40. A third monomer can be present in an amount such that the mole ratio of ethylene to tetrafluoroethylene to third monomer is about 40–60:15–50:0–35. Preferably the third monomer is present in an amount of about 5 to about 30 mole %. The third monomer can be for example hexafluoropropylene; 3,3,3-tri-fluoropropylene-1; 2-trifluoromethyl-3,3,3-trifluoro-propylene-1; or perfluoro(alkyl vinyl ether). The term ETFE is used herein to include polymers which may contain a third monomer. The amount of ETFE in the composition of this invention can be from about 1 to 99 percent by weight, based on the weight of (A) and (B), more preferably from about 5 to about 95 weight % and most preferably about 30 to about 70%. The melting point of ETFE varies depending on the mole ratio of ethylene and tetrafluoroethylene and the presence of a third monomer. Commercially available ETFE polymers have melting points of 220° C. and 270° C.

The thermoplastic vinylidene fluoride polymer (PVDF) used in the composition can be a homopolymer or copolymer. The thermoplastic vinylidene fluoride polymer is substantially crystalline and exhibits a thermodynamic melting transition. Preferably the polymer is at least about 15% crystalline, more preferably at least about 25% crystalline.

Suitable thermoplastic vinylidene fluoride copolymers contain one or more comonomers units, such as, hexafluoropropylene, pentafluoropropylene, perfluoroethoxyethylene or tetrafluoroethylene. Vinylidene fluoride preferably is present in the thermoplastic polymer in an amount of at least about 75 mole percent. A preferred copolymer contains vinylidene fluoride and hexafluoropropylene units and optionally, minor amounts of suitable termonomer units, for example fluoropropylene or perfluoroethoxyethylene units.

In accordance with this invention, ETFE or PVDF is blended with a thermoplastic elastomer. The term "thermoplastic elastomer" is used herein to mean an elastomer which has an observable melt transition and shows elasticity like a cross-linked elastomer at a comparatively low temperature and shows plastic flow when heated. The thermoplastic elastomer comprises a polymeric chain comprising at least one elastomeric polymer segment and at least one non-elastomeric polymer segment. Preferably, the weight proportion of the elastomeric polymer segment to the non-elastomeric polymer segment is about 5–95:95–5, more preferably about 20–95:8–5 and most preferably 10–70:30–90 and in particular 20–50:50–30 or 50–20:30–50, depending on the intended use.

The elastomeric segment of the thermoplastic elastomer comprises (a) vinylidene fluoride, hexa- or pentafluoropropylene, and tetrafluoroethylene repeating units in a mole ratio of 45–90:5–50:0–35, preferably 45–60:20–40:10–30, or (b) perfluoro(alkyl vinyl ether), tetrafluoroethylene, and vinylidene fluoride repeating units in a mole ratio of 15–75:0–85:0–85. The perfluoro(alkyl vinyl ether) monomer used preferably contains alkyl groups containing 1 to 3 carbon atoms. The monomer can contain a plurality of ether linkages. The elastomeric polymer segment preferably has a molecular weight of from about 10,000 to about 10,000,000.

The nonelastomeric segment can comprise ethylene and tetrafluoroethylene repeating units and can further comprise hexafluoropropylene; 3,3,3-trifluoropropylene-1; 2-trifluoromethyl-3,3,3-trifluoropropylene-1; or perfluoro(alkyl vinyl ether) repeating units in a mole ratio of 40–60:15–50:0–35, preferably 40–60:60–40:0–20. The nonelastomeric segment preferably has a molecular weight of from about 1000 to about 1,000,000, more preferably from about 5000 to 500,000.

Alternatively, the nonelastomeric segment comprises vinylidene fluoride, hexafluoropropylene and tetrafluoroethylene repeating units in a mole ratio of 0–100:0–50:0–100. The nonelastomeric segment must of course contain at least one of these components, and may only contain vinylidene fluoride units i.e. have a mole ratio of 100:0:0 or only tetrafluoroethylene units i.e. have a mole ratio of 0:0:100. The nonelastomeric segment preferably has a molecular weight of from about 1000 to about 1,000,000, more preferably from about 5000 to 500,000.

Preferred thermoplastic elastomers, which may contain iodine, are disclosed in U.S. Pat. No. 4,158,678, the disclosure of which is hereby incorporated by reference.

The composition may contain the thermoplastic polymer in an amount from about 1 to about 99% by weight, and thermoplastic elastomer in an amount of from about 99 to about 1% by weight based on the weight of (A) and (B), more preferably from about 5 to about 95% by weight thermoplastic polymer and from about 95 to about 5% weight thermoplastic elastomer and most preferably from about 10 to about 90% by weight thermoplastic polymer and from about 90 to about 10% by weight thermoplastic elastomer, (% by weight being based on the combined weight of thermoplastic polymer and thermoplastic elastomer).

The blends of this invention are preferably prepared by melt blending the thermoplastic polymer and thermoplastic elastomer components in for example a twin screw extruder, Banbury mixer, Brabender or the like at temperatures above the melting temperatures of the thermoplastic polymer and thermoplastic elastomer.

Various additives can be added to the polymeric composition. Such additives include for example, antioxidants such as alkylated phenols, e.g. those commercially available as Goodrite 3125, Irganox 1010, Irganox 1035, Irganox 1076, Irganox 1093, Vulkanox BKF, organic phosphite or phosphates, e.g. dilauryl phosphite, Mark 1178, alkylidene polyphenols, e.g. Ethanox 330, thio-bis alkylated phenol, e.g. Santonox R, dilauryl thio-dipropionate, e.g. Carstab DLTDP, dimyristyl thiodipropionate, e.g. Carstab DMTDP, distearyl thiodipropionate, e.g. Cyanox STDP, amines, e.g. Wingstay 29 etc; UV stabilizers such as [2,2'-thio-bis(4-t-octylphenolato)]n-butylamine nickel, Cyasorb UV 1084, 3,5-ditertiarybutyl-p-hydroxybenzoic acid, UV Chek Am-240; flame retardants such as decabromodiphenyl ether, perchloropentacyclodecane, 1,2-bis(tetrabromophthalimido) ethylene; pigments such as titanium dioxide, antimony trioxide, zinc oxide, iron oxide, etc, and the like. Mixtures of such additives can be used.

The composition of this invention has numerous uses. In general, the composition has good electrical insulating characteristics but can be made conductive, as discussed more fully below. The compositions can be formed into shaped articles, coatings, or the like, by melt processing techniques such as extrusion, by casting, machining, or the like. A preferred use of the composition of this invention is as an insulation for an elongate electrical conductor, such as a wire or cable. Another preferred use of the composition of this invention is in the preparation of heat recoverable articles, particularly articles for use as wire and cable harnessing.

A heat recoverable article is one whose dimensional configuration may be made to change when subjected to an appropriate treatment.

Usually these articles recover, on heating, towards an original shape from which they have previously been deformed but the term "heat-recoverable," as used herein, also includes an article which, on heating, adopts a new configuration, even if it has not been previously deformed.

In their most common form, heat-recoverable articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded, while hot, to a dimensionally heat-unstable form but, in other applications, a preformed dimensionally heat stable article is deformed to a dimensionally heat unstable form in a separate stage.

In the production of heat recoverable articles, the polymeric material may be cross-linked (as discussed more fully below) at any stage in the production of the article that will enhance the desired dimensional recoverability. One manner of producing a heat-recoverable article comprises shaping the polymeric article into the desired heat-unstable form, subsequently cross-linking the polymeric material, heating the article to a temperature above the crystalline melting point of the polymer, deforming the article and cooling the article whilst in the deformed state so that the deformed state of the article is retained. In use, since the deformed state of the article is heat-unstable, application of heat will cause the article to assume its original heat-stable shape.

In another embodiment of the invention, the composition is rendered conductive by dispersing conductive particles such as carbon black, metal powder, metal flakes or the like in the composition.

The amount of conductive particles added to the polymeric blend depends on the desired resistivity of the compositions. In general, about 0.5 to about 50, preferably about 5 to about 40 and most preferably about 5 to about 25, weight %, based on the weight of (A) and (B) are added. The conductivity of the conductive polymeric composition varies depending on the use of the composition. In a preferred embodiment the conductivity is below about 2000 ohmcm, more preferably below about 500 ohm-cm. The conductivity is preferably greater than about 0.01, more preferably 0.1 ohm-cm.

The conductive composition of this invention is particularly useful as a conductive jacket for electrical cables. For example the composition can be applied as a conductive jacket on a high frequency attenuative cable as discussed in above-noted U.S. Pat. No. 4,347,487. Such a cable is depicted in the drawing in which central conductor, 1, is surrounded by a layer of an absorptive medium 2 for absorbing high frequency energy. Surrounding the absorptive medium is an insulating or dielectric layer 3. A shield 4 surrounds the insulating layer and a jacket 5 of the conductive composition of this invention surrounds the shield. As discussed in the '487 patent, a plurality of such cables can be bundled together to form a harness. Further, the cable may comprise a plurality of wires, each surrounded by a layer of absorptive medium and a layer of insulative enclosed within a common shield over which a jacket, which can comprise a composition of this invention, over the shield. In this embodiment, the thermoplastic polymer is preferably ETFE and the thermoplastic elastomer preferably comprises nonelastomeric segments comprising vinylidene fluoride, hexafluoropropylene and tetrafluoroethylene in a mole ratio of 0–100:0–50:0–100.

The conductive compositions can also be used to prepare electric devices such as heaters, sensors, circuit protection devices such as those disclosed in U.S. Pat. Nos. 2,952,761, 2,978,665, 3,243,753, 3,351,882, 3,571,777, 3,658,976, 3,757,086, 3,793,716, 3,823,217, 3,858,144, 3,861,029, 3,950,604, 4,017,715, 4,072,848, 4,085,286, 4,117,312, 4,151,126, 4,177,376, 4,177,446, 4,188,276, 4,237,441, 4,242,573, 4,246,468, 4,250,400, 4,252,692, 4,255,698, 4,271,350, 4,272,471, 4,304,987, 4,309,596, 4,309,597, 4,314,230, 4,314,231, 4,315,237, 4,317,027, 4,318,881, 4,327,351, 4,330,704, 4,334,351, 4,352,083, 4,361,799, 4,388,607, 4,398,084, 4,413,301, 4,425,397, 4,426,339, 4,426,633, 4,427,877, 4,435,639, 4,429,216, 4,442,139, 4,473,450, 4,529,866, 4,459,473, 4,470,898, 4,481,498, 4,476,450, 4,502,929, 4,514,620, 4,517,449, 4,534,889, 4,560,498, 4,574,188, 4,631,692, 4,638,150, and 4,639,818; copending commonly assigned U.S. Application Ser. Nos. 896,549 filed Aug. 14, 1986, now U.S. Pat. No. 4,859,836, 711,909 filed Mar. 14, 1985, now U.S. Pat. No. 4,772,024, 720,118, 764,894 filed Aug. 12, 1985, now U.S. Pat. No. 4,722,853, 818,845, now abandoned, 818,846, now abandoned, 656,046, now abandoned, 650,921, now abandoned, 711,910 filed Mar. 14, 1985, now U.S. Pat. No. 4,724,417,735,428 filed May 17, 1985, now U.S. Pat. No. 4,700,054, 780,524, now abandoned, 820,276, now abandoned, 732,527 filed May 09, 1985, now U.S. Pat. No. 4,661,687, 810,134 filed Dec. 16, 1985, now U.S. Pat. No. 4,849,611, 784,288 filed Oct. 04, 1985, now U.S. Pat. No. 4,743,321, 913,290, 711,790 filed Mar. 14, 1985, now U.S. Pat. No. 4,685,025, 711,907 filed Mar. 14, 1985, U.S. Pat. No. 4,647,894 711,908 filed Mar. 14, 1985, now U.S. Pat. No. 4,647,896, 832,562, now abandoned, 716,780 filed Mar. 26, 1985, now U.S. Pat. No. 4,698,583, 838,725, 831,758, now abandoned, and 864,930 filed May, 19, 1986, now U.S. Pat. No. 4,861,966 ; and European Application Nos. 38,713, 38,714, 38,718, 74,281, 92,406, 119,807, 133,748, 134,145, 144,187, 157,640, 158,410, 175,550 and 176,284; and Japanese Published Patent Application No. 59-122,524. The disclosure of each of the patents and applications referred to above is incorporated herein by reference.

Compositions of this invention comprising a thermoplastic vinylidene fluoride polymer are crosslinked. Compositions comprising ETFE can be crosslinked, if desired. Crosslinking can be achieved for example by use of a suitable cross-linking agent, such as a peroxide or amine, or by irradiation.

In a preferred embodiment, the composition is crosslinked by irradiation. The dosage employed in the irradiation step is generally below about 50 Mrads to ensure that the polymer is not degraded by excessive irradiation. The dosage preferably employed depends upon the extent of crosslinking desired, balanced against the tendency of the polymer to be degraded by high doses of irradiation. Suitable dosages are generally in the range 2 to 40 Mrads, for example 2 to 30 Mrads, preferably 3 to 20 Mrads, especially 4 to 25 or 4 to 20 Mrads, particularly 4 to 15 Mrads. The ionising radiation can for example be in the form of accelerated electrons or gamma rays. Irradiation is generally carried out at about room temperature, but higher temperatures can also be used.

Prior to irradiation it is preferred to incorporate a crosslinking agent into the composition. Preferred radiation crosslinking agents contain carbon-carbon unsaturated groups in a molar percentage greater than 15, especially greater than 20, particularly greater than 25, based on the total molar amount of (A) and (B). In many cases the cross-linking agent contains at least two ethylenic double bonds, which may be present, for example, in allyl, methallyl, propargyl, or vinyl groups. We have obtained excellent results with crosslinking agents containing at least two allyl groups, especially three or four allyl groups. Particularly preferred crosslinking agents are triallyl cyanurate (TAC) and triallyl isocyanurate (TAIC); other specific cross-linking agents include triallyl trimellitate, triallyl trimesate, tetrallyl pyromellitate, the diallyl ester of 1,1,3-trimethyl-5-carboxy-3-(p-carboxyphenyl) indan. Other crosslinking agents which are known for incorporation into fluorocarbon polymers prior to shaping, for example those disclosed in U.S. Pat. Nos. 3,763,222, 3,840,619, 3,894,118, 3,911,192, 3,970,770, 3,985,716, 3,995,091, 4,031,167, 4,155,823 and 4,353,961. Mixtures of crosslinking agents can be used.

The following examples illustrate this invention. In the example all parts given are in parts by weight, unless otherwise specified.

EXAMPLES 1-6

Sample compositions containing ETFE having a melting point of 220° C.; a thermoplastic elastomer (TPE) having a hard segment containing ethylene, tetrafluoroethylene and hexafluoropropylene units and a soft segment containing vinylidene fluoride, tetrafluoroethylene and hexa fluoropropylene units (Dai-el T-530 available from Daikin Industries); triallylisocyanurate (TAIC) and minor amounts of other additives in the proportions listed in Table I were blended in a Banbury mixer for 3-4 minutes at about 240° C.

Each sample composition was molded into 25 mil slabs and irradiated at a total dosage of 5.0 Mrads. Tensile elongation and secant modulus measurements were made on unirradiated, irradiated and irradiated/annealed samples. Annealing was carried out by heating irradiated samples at 150° C. for 2 hours. The measurements of E30 and M100 were made on irradiated/annealed samples as well as on irradiated samples. Solvent resistance, heat aging, and cold impact brittleness temperature tests were carried out only on irradiated samples.

The physical properties are reported in Table I. The measurements of E30 and M100 were carried out by the Static Modulus Procedure of R.M. Black, The Electrical Manufacturer, October 1957.

$$M100 = \frac{\text{Force to achieve 100\% elongation}}{\text{initial cross-sectional area}}$$

$$E30 = \frac{\text{Force to achieve 30\% elongation}}{\text{initial cross-sectional area}}$$

Tensile and elongation, including measurements made after heat aging and solvent immersion, were carried out according to ASTM D 412, secant modulus according to ASTM D 882 and cold impact brittleness temperature according to ASTM D 746.

The solvent resistance test were carried out by immersing test specimens (0.025 inches thick by ⅛" wide) in the respective fluids, Skydrol 500 for 24 hrs at room temperature and DS-2 for 4 hrs at room temperature, and then measuring tensile and elongation. Skydrol 500 is a phosphate ester hydraulic fluid (available from Monsanto Co.) DS-2 is a mixture of diethylene triamine (70%), ethylene glycol monomethyl ether (28%) and NaOH (2%). The heat aging test was carried out by placing test specimens (0.025 inches by ⅛" wide) in an oven regulated at 250° C. for 1 week and 2 weeks respectively and then measuring tensile (T) and elongation (E).

TABLE I

| | SAMPLE | | | | | | |
| --- | --- | --- | --- | --- | --- | --- | --- |
| | 1 | 2 | 3 | 4 | 5 | 6 | Control |
| ETFE (Tm = 220° C.) | 77 | 67 | 57 | 50 | 30 | 10 | 97 |
| TPE | 20 | 30 | 40 | 47 | 67 | 87 | — |
| TAIC | 2.1 | 2.1 | 2.1 | 2.1 | 2.1 | 2.1 | 2.1 |
| ADDITIVES | 0.9 | 0.9 | 0.9 | 0.9 | 0.9 | 0.9 | 0.9 |
| TENSILE, PSI | | | | | | | |
| UNIRR | 4719 | 4320 | 3543 | 3180 | 1430 | 620 | 4848 |
| IRR | 4704 | 4336 | 4458 | 3950 | 3690 | 3370 | 5239 |
| IRR/ANNEALED | 4639 | 4437 | 4070 | 4060 | 3470 | 3330 | 4931 |
| ELONGATION, % | | | | | | | |
| UNIRR | 366 | 380 | 385 | 420 | 540 | 1040 | 320 |
| IRR | 305 | 317 | 337 | 335 | 365 | 400 | 280 |
| IRR/ANNEALED | 280 | 305 | 310 | 330 | 350 | 405 | 243 |
| SECANT MODULUS, 2% | | | | | | | |
| UNIRR | 35,570 | 27,900 | 20,000 | 16,400 | 3250 | 880 | 49,620 |
| IRR | 46,540 | 36,060 | 25,850 | 21,000 | 4370 | 1060 | 65,260 |
| IRR/ANNEALED | 43,450 | 34,180 | 23,980 | 19,700 | 4310 | 990 | 61,500 |
| E30 (AT 250° C.) | | | | | | | |
| IRR | 166 | 147 | 124 | 122 | 114 | 101 | 222 |
| IRR/ANNEALED | 199 | 176 | 171 | 159 | 142 | 122 | 263 |
| M100 (AT 250° C.) | | | | | | | |
| IRR | 91 | 76 | 71 | 74 | 70 | 66 | 120 |
| IRR/ANNEALED | 114 | 105 | 99 | 100 | 90 | 76 | 151 |
| SOLVENT RESISTANCE | | | | | | | |
| T/E AFTER EXPOSURE TO DS-2 (4 HRS/RT) | 3952/280 | 3340/272 | 2937/275 | 2880/290 | 2600/320 | 2270/360 | 5094/277 |
| SKYDROL 500 (24 HRS/RT) | 3810/278 | 3870/304 | 4118/333 | 4180/345 | 3280/360 | 2110/360 | 4284/255 |
| HEAT AGING (T & E AFT.) | | | | | | | |
| 1 WK (250° C.) | 3673/337 | 3327/345 | 3383/381 | 3220/380 | 2400/440 | 1640/510 | 4551/310 |
| 2 WK (250° C.) | 2806/299 | 2699/325 | 2764/364 | 2890/400 | 1940/460 | 1310/545 | 4509/337 |
| COLD IMPACT BRITTLENESS TEMP. | ALL PASSED AT −65° C. | | | | | | |

EXAMPLES 7-12

A second series of compositions was made identical to those of Examples 1-6, except that an ETFE having a melting temperature of 270° C. was used and the compositions were prepared in a 1½ inch single screw extruder at a temperature of about 300° C. The formulations and test results are reported in Table II.

TABLE II

| | SAMPLE | | | | | | |
|---|---|---|---|---|---|---|---|
| | 7 | 8 | 9 | 10 | 11 | 12 | Control |
| ETFE (Tm = 270° C.) | 77 | 67 | 57 | 47 | 27 | 10 | 97 |
| TPE | 20 | 30 | 40 | 50 | 70 | 87 | — |
| TAIC | 2.1 | 2.1 | 2.1 | 2.1 | 2.1 | 2.1 | 2.1 |
| ADDITIVES | 0.9 | 0.9 | 0.9 | 0.9 | 0.9 | 0.9 | 0.9 |
| TENSILE, PSI | | | | | | | |
| UNIRR | 4830 | 4070 | 3635 | 2370 | 1470 | 770 | 5928 |
| IRR | 4790 | 4535 | 4290 | 3980 | 3130 | 2880 | 5585 |
| IRR/ANNEALED | 4884 | 4515 | 4470 | 4040 | 3490 | 3180 | 5560 |
| ELONGATION, % | | | | | | | |
| UNIRR | 315 | 325 | 325 | 290 | 505 | 955 | 290 |
| IRR | 240 | 255 | 280 | 305 | 325 | 380 | 220 |
| IRR/ANNEALED | 220 | 230 | 260 | 290 | 335 | 390 | 180 |
| SECANT MODULUS, 2% | | | | | | | |
| UNIRR | 58,690 | 51,200 | 24,560 | 16,700 | 5110 | 1050 | 86,400 |
| IRR | 76,550 | 59,970 | 34,860 | 24,300 | 6040 | 1160 | 107,020 |
| IRR/ANNEALED | 59,810 | 49,600 | 28,980 | 19,000 | 5910 | 1190 | 83,590 |
| E30 (AT 300° C.) | | | | | | | |
| IRR | 118.5 | 105.6 | 85.6 | 72 | 68 | 70 | 147.8 |
| IRR/ANNEALED | 154.0 | 132.0 | 118.6 | 110 | 90 | 89 | 177.0 |
| M100 (AT 300° C.) | | | | | | | |
| IRR | 71.1 | 60.9 | 54.5 | 47 | 45 | 48 | 81.1 |
| IRR/ANNEALED | 97.6 | 89.4 | 79.9 | 77 | 63 | 59 | 112.7 |
| SOLVENT RESISTANCE | | | | | | | |
| T/E AFTER EXPOSURE TO DS-2 (4 HRS/RT) | 5612/303 | 5875/327 | 5328/330 | 3510/275 | 2620/295 | 2290/350 | 6934/278 |
| SKYDROL 500 (24 HRS/RT) | 4944/232 | 6288/335 | 5623/335 | 3890/300 | 2870/320 | 1920/340 | 8348/325 |
| HEAT AGING (T & E AFT.) | | | | | | | |
| 1 WK (250° C.) | 4187/207 | 3821/232 | 3007/230 | 2450/250 | 1800/355 | 1500/510 | 4526/150 |
| 2 WK (250° C.) | 3928/170 | 3225/162 | 2651/165 | 1730/170 | 1410/360 | 1180/570 | 4795/150 |
| COLD IMPACT BRITTLENESS TEMP. | ALL PASSED AT −65° C. | | | | | | |

The results in Tables 2 and 3 show that the blends of this invention unexpectedly have improved flexibility compared to the ETFE control while substantially retaining the desirably high tensile strength, solvent resistance and other physical properties.

EXAMPLES 13–16

Conductive compositions having the ingredients specified in Table III below were prepared by blending the ingredients in a Banbury mixer (Sample 13), in a twin screw extruder (Sample 16) and by dry blending pellets of the compositions of Samples 13 and 16 to produce Samples 14 and 15 as described in Examples 1–6 using the components and amounts specified in Table III.

A cable was prepared by extruding a jacket 6½ mils thick of the formation over a cable core comprising a shielded, twisted pair having an outer diameter of 0.183 inch. The jacketed cable was irradiated at a dose of 10 Mrads to cross-link the jacket composition.

The Elongation, Ultimate Tensile strength, Solvent Resistance, Blocking, and Volume resistivity, using the procedures set forth in military specification MIL-C-85485. The flex durability was determined by bending the cable through 180° over a mandrel, reversing it, then repeating the sequence until a crack appears. The results

TABLE III

| | 13 | 14 | 15 | 16 |
|---|---|---|---|---|
| ETFE | — | 37.4 | 56.2 | 74.9 |
| TPE | 78 | 39.00 | 19.5 | — |
| Carbon Black (Vulcan XC-72) | 17 | 16.8 | 16.6 | 16.5 |
| Additives | — | 1.3 | 2.0 | 2.6 |
| TAIC | 5 | 5.5 | 5.7 | 6 |
| Test Results: | | | | |
| % Elongation | 200 | 150 | 100 | 110 |
| Ultimate Tensile (PSI) | 3000 | 4200 | 3800 | 5500 |
| Skydrol LD4 (% Swell) | 8.9 | 0 | 2 | 0 |
| Blocking @ 200 | Fail | Pass | Pass | Pass |
| Volume Resistivity (−cm) | 1.3 | 4.7 | 3.3 | 2.9 |
| Flex Durability (Cycles; 0.196" Mandrel) | | | | |
| Range | 100+ | 60-100+ | 41-93 | 13-30 |
| AVG | >100+ | 78+ | 60 | 23 |

EXAMPLES 17–18

Sample compositions containing a thermoplastic copolymer containing vinylidene fluoride and hexafluoropropylene repeating units (Kynar 2800 available from Pennwalt Corp.), a thermoplastic elastomer (TPE) having a hard segment containing vinylidene fluoride repeating units and a soft segment containing vinylidene fluoride, tetrafluoroethylene and hexafluoropropylene units (Dai-el T-630 available from Daikin Industries); triallylisocyanurate (TAIC) and minor amounts of other additives in the proportions listed in Table IV were melt blended on a heated two roll mill for 10 minutes at 175° C.

Each sample composition was compression molded into a slab 6"×6"×0.075" at 175° C. and 40,000 psi. Each slab was irradiated at a dosage of 2.5 Mrads on each side. Tensile and elongation tests were done according to ASTM D638, testing at 2 inches/minute, secant modulus testing was done according to ASTM D882 and brittle impact testing according to ASTM D876. The results are reported in Table IV.

TABLE IV

| | Sample | | |
|---|---|---|---|
| | 17 | 18 | Control |
| PVDF | 68.9 | 38.9 | 98.9 |
| TPE | 30.0 | 60.0 | — |
| TAIC | 1.0 | 1.0 | 1.0 |
| ADDITIVES | 0.1 | 0.1 | 0.1 |
| Test Results | | | |
| Tensile Strength | 4,990 | 3,410 | 6,420 |
| Elongation % | 525 | 515 | 555 |
| 2% Secant Modulus, psi | 33,900 | 10,100 | 58,100 |
| Brittle Impact Temp., °C. | −29° C. | −42° C. | −12° C. |

EXAMPLES 19-20

Sample compositions containing vinylidene fluoride homopolymer and thermoplastic elastomer used in Examples 17-18, TAIC and minor amounts of other additives in the proportions listed in Table V were melt blended in a twin screw extruder. The sample compositions were extruded onto a 20 AWG (19/32) Tin/Copper wire with a wall thickness of 10 mil. The coated wires were irradiated to dosages of 5, 10 and 15 megarads (Mrads). The M100 modulus was measured at 200° C. using the Static Modulus Procedure of R.M. Black, The Electrical Manufacturer, October 1957.

$$M100 = \frac{\text{Force to achieve 100\% elongation}}{\text{initial cross-sectional area}}$$

The tensile and elongation tests were done according to Federal Standard 228, Method 3021 (for tensile strength) and Method 3031 (for elongation). The reports are reported in Table V.

TABLE V

| | Sample | | |
|---|---|---|---|
| | 19 | 20 | Control |
| PVDF | 81.8 | 77.1 | 97.4 |
| TPE | 10.0 | 20.0 | 0 |
| TAIC | 2.2 | 2.0 | 2.5 |
| Additives | 1.0 | 0.9 | 1.1 |
| Test Results | | | |
| Irradiation Dose | | | |
| 5 Mrads | | | |
| M100 (psi) | 43 | 58 | 46 |
| % Elongation | 485 | 495 | 485 |
| Tensile Strength (psi) | 8840 | 9130 | 9300 |
| 10 Mrads | | | |
| M100 (psi) | 75 | 100 | 86 |
| % Elongation | 405 | 400 | 345* |
| Tensile Strength (psi) | 8990 | 9040 | 6930 |
| 15 Mrads | | | |
| M100 (psi) | 92 | 120 | 108 |
| % Elongation | 325 | 355 | 335* |
| Tensile Strength (psi) | 8250 | 8340 | 6110 |

*Most test specimens ruptured prior to strain hardening.

What is claimed is:

1. A composition comprising a blend of:
(A) A thermoplastic polymer selected from copolymers of ethylene, tetrafluoroethylene; and
(B) a thermoplastic elastomer having (i) at least one elastomeric Segment comprising (a) vinylidene fluoride, hex- or pentafluoropropylene, and tetrafluoroethylene repeating units in a mole ratio of 45-90:5-50:0-35 or (b) perfluoro(alkyl vinyl ether), tetrafluoroethylene, and vinylidene fluoride repeating units in a mole ratio of 15-75:0-85; and (ii) at least one nonelastomeric segment selected from segments comprising ethylene and tetrafluoroethylene repeating units in a mole ratio of 40-60:6014 40, or segments comprising vinylidene fluoride, hexafluoropropylene and tetrafluoroethylene repeating units in a mole ratio of 0-100:0-50:0-100, the weight proportion of (i) to (ii) being about 5-95:95-5; wherein (A) is present in an amount of about 1 to about 99% by weight and (B) is present in an amount of about 99 to about 1% by weight, based on the weight of the blend.

2. A composition comprising a blend of:
(A) a copolymer of ethylene, tetrafluoroethylene and a third monomer in the mole ratio of 40-60:15-50:0-35; and
(B) a thermoplastic elastomer having
(i) at least one elastomeric segment comprising (a) vinylidene fluoride, hexa- or pentafluoropropylene, and tetrafluoroethylene repeating units in a mole ratio of 45-90:5-50:0-35 or (b) perfluoro(alkyl vinyl ether), tetrafluoroethylene, and vinylidene fluoride repeat units in a mole ratio of 15-75:0-85:0-85; and
(ii) at least one nonelastomeric segment comprising ethylene and tetrafluoroethylene repeating units in a mole ratio of 40-60:60-40, the weight proportion of (i) to (ii) being about 5-95:95-5; wherein (A) is present in an amount of about 1 to about 99% by weight and (B) is present in an amount of about 99 to about 1% by weight, based on the weight of the blend.

3. A composition in accordance with claim 1 wherein (A) is present in an amount of about 5 to about 95% by weight and (B) is present in an amount of about 95 to about 5% by weight of the blend.

4. A composition in accordance with claim 1 wherein (A) is present in an amount of about 10 to about 70% by weight and (B) is present in an amount of about 90 to about 30% by weight of the blend.

5. A composition in accordance with claim 2 wherein the third monomer in thermoplastic polymer (A) is hexafluoropropylene; 3,3,3-trifluoropropylene-1; 2-trifluoromethyl-3,3,3-trifluoropropylene-1; or perfluoro (alkyl vinyl ether). pg,34

6. A composition in accordance with claim 2 wherein the nonelastomeric segment (B) (ii) further comprises hexafluoropropylene; 3,3,3-trifluororopropylene-1, 2-trifluoromethyl-3,3,3-trifluoropropylene-1; or perfluoro(alkyl vinyl ether) repeating units.

7. A composition in accordance with claim 2 wherein the elastomeric segment (Bi) comprises vinylidene fluoride, hexafluoropropylene and tetrafluoroethylene in a mole ratio of about 45-90:5-50:0-35.

8. A composition in accordance with claim 2 wherein said nonelastomeric segment (Bii) comprises ethylene, tetrafluoroethylene and hexafluoropropylene in a mole ratio of about 40-60:15-50:0-35.

9. A composition in accordance with claim 2 which further comprises a crosslinking agent.

10. A composition in accordance with claim 9 wherein said cross-linking agent is selected from the group consisting of triallyl cryanurate, triallyl isocyanurate, triallyl trimellitate, triallyl trimesate, tetrallyl pyromellitate, the diallyl ester of 1,1,3-trimethyl-5-carboxy-3(p-carboxyphenyl) indan.

11. A composition in accordance with claim 2 which has been cross-linked.

* * * * *